(12) United States Patent
Gussen et al.

(10) Patent No.: US 9,175,660 B2
(45) Date of Patent: Nov. 3, 2015

(54) METHOD FOR OPERATING A VEHICLE (71) Applicant: Ford Global Technologies, LLC, Dearborn, MI (US)

(72) Inventors: Uwe Gussen, Huertgenwald (DE); Frederic Stefan, Aachen (DE); Thomas Rambow, Aachen (DE); Goetz-Philipp Wegner, Dortmund (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/297,013

(22) Filed: Jun. 5, 2014

(65) Prior Publication Data
US 2014/0365051 A1 Dec. 11, 2014

(30) Foreign Application Priority Data

Jun. 10, 2013 (DE) .......................... 10 2013 210 759

(51) Int. Cl.
*B60W 20/00* (2006.01)
*B60W 10/06* (2006.01)
*B60W 10/08* (2006.01)
*F02N 11/08* (2006.01)
*F02N 11/04* (2006.01)
*F02N 15/08* (2006.01)

(52) U.S. Cl.
CPC ........... *F02N 11/0822* (2013.01); *B60W 10/06* (2013.01); *B60W 10/08* (2013.01); *B60W 20/00* (2013.01); *F02N 11/0833* (2013.01); *F02N 11/04* (2013.01); *F02N 15/08* (2013.01); *F02N 2200/0801* (2013.01); *F02N 2200/101* (2013.01); *F02N 2200/103* (2013.01); *Y02T 10/6286* (2013.01); *Y10S 903/902* (2013.01)

(58) Field of Classification Search
CPC ..... B60W 10/06; B60W 10/08; B60W 20/00; B60W 30/18027; Y02T 10/6286; Y10S 903/902; B60K 6/485; F02N 2300/20
See application file for complete search history.

(56) References Cited

U.S. PATENT DOCUMENTS

| 6,040,634 | A | 3/2000 | Larguier |
| 6,082,476 | A | 7/2000 | Stulbach |
| 7,220,217 | B2 | 5/2007 | Tamai et al. |
| 7,263,959 | B2 | 9/2007 | Kataoka et al. |
| 2002/0121256 | A1* | 9/2002 | Warren et al. ............... 123/179.3 |
| 2003/0089538 | A1* | 5/2003 | Boggs et al. ................. 180/65.2 |
| 2011/0061955 | A1 | 3/2011 | Hoffmann |
| 2011/0301791 | A1* | 12/2011 | Swales et al. ................... 701/22 |
| 2012/0006152 | A1 | 1/2012 | Fuechtner |
| 2014/0136083 | A1* | 5/2014 | Meitinger et al. ............ 701/110 |

FOREIGN PATENT DOCUMENTS

| DE | 102008020650 A1 | 11/2009 |
| EP | 1932704 B1 | 10/2011 |

* cited by examiner

*Primary Examiner* — Michael J Zanelli
(74) *Attorney, Agent, or Firm* — Greg Brown; Alleman Hall McCoy Russell & Tuttle LLP (57) ABSTRACT

A method for operating a vehicle system is provided. The method includes activating a starter-generator rotationally coupled to a crankshaft output in an internal combustion engine while combustion operation in the internal combustion engine is inhibited, operating the starter-generator to drive the crankshaft in a predetermined speed range while combustion operation in the internal combustion engine is inhibited, and activating combustion operation in a cylinder of the internal combustion engine in response to a combustion activation trigger.

19 Claims, 6 Drawing Sheets

METHOD FOR OPERATING A VEHICLE

CROSS REFERENCE TO RELATED APPLICATION

This application claims priority to German Patent Application Number 102013210759.5, filed Jun. 10, 2013, the entire contents of which are hereby incorporated by reference for all purposes.

FIELD

The present disclosure relates to a method for operating a vehicle, in particular a motor vehicle.

BACKGROUND AND SUMMARY

In order to ensure the mobility of vehicles irrespective of external influencing forces, vehicles are suitably motorized. For this purpose prime movers are used, which are mainly integrated into the vehicles, but may also be arranged thereon. For the most part internal combustion engines are used as prime movers, although these are increasingly being supplemented or even replaced by electric motors.

Purely electric vehicles typically have a smaller range than vehicle using internal combustion engine, due to the limited energy density of batteries or other energy accumulators in the electric vehicles. Moreover, electric vehicle batteries are a cost-intensive technology and make inexpensive series production difficult. Hybrid vehicles in series production are may have reduced fuel consumption. However, this reduced fuel consumption may come at a higher purchase price than an equivalent vehicle using only an internal combustion engine for motive power.

Measures for reducing the fuel consumption in conventional vehicles may be directed towards purposely shutting off the internal combustion engine. These engines may therefore shut off by an automatic start-stop system, particularly in stationary phases, in the absence of any torque demand. In vehicles with manual shift transmission, a start signal is then triggered through the actuation of the clutch pedal, for example, which restarts the internal combustion engine. Where automatic transmissions are used, this start signal is generated, for example, by lifting the brake pedal or cancelling an alternative brake actuation device.

Additionally, small electric motors may be integrated into vehicles with internal combustion engine to provide electric boosting without a substantial increase in vehicle cost. In such a vehicle, the electrical drive mode the electric motor may drive at least one drive axle of the vehicle, whilst the internal combustion engine is at a standstill. In these vehicles, the internal combustion engine is coupled to another drive axle. The electric motor may also be used to charge a battery during some vehicle operating conditions.

However, the Inventors have recognized several drawbacks with this type of vehicle. For instance, it may be costly to separately connect the electric motor one drive axle and the internal combustion engine to another drive axle. Moreover, coupling the electric motor and internal combustion engine to the drive axles in this way may increase the bulkiness of the vehicle. Furthermore, the electric motor cannot crank the engine in this type of vehicle.

As such, a method for operating a vehicle system is provided. The method includes activating a starter-generator rotationally coupled to a crankshaft output in an internal combustion engine while combustion operation in the internal combustion engine is inhibited, operating the starter-generator to drive the crankshaft in a predetermined speed range while combustion operation in the internal combustion engine is inhibited, and activating combustion operation in a cylinder of the internal combustion engine in response to a combustion activation trigger. In this way, the starter-generator may be used to drive the crankshaft at an idle speed without operation of the internal combustion engine, for example. It will be appreciated that this method may be implemented when the vehicle is stopped for a short duration, for instance. As a result, fuel consumption and vehicle emission are reduced, thereby improving vehicle operation. It will be appreciated that this method may be used in an internal combustion having a clutch and a manual shift transmission. Consequently, the vehicle system may be inexpensively integrated into existing engines, if desired, thereby reducing manufacturing costs of the vehicle system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

Further advantageous details and effects of the invention are explained in more detail below with reference to exemplary embodiments represented in the following figures, of which.

DETAILED DESCRIPTION

EP 1 932 704 B1 sets forth a method for the efficient operation of a hybrid vehicle. The hybrid vehicle comprises an internal combustion engine and two starter-generators. The starter-generators serve either as electric motors or as recuperators, either consuming or generating electrical current. Depending on the load state, the wheels of the hybrid vehicle are driven either by one or by both of the starter-generators, or in a respective combination with the internal combustion engine. In order to reduce the losses due to friction during a purely electrical operating phase at low speeds, it is proposed in EP 1 932 704 B1 to temporarily decouple the then inactive internal combustion engine. In this way there is no need to sustain the drag of the internal combustion engine. For this purpose at least one of the starter-generators is arranged between the clutch and the wheels to be driven. If a low battery condition is detected, the internal combustion engine can be switched on selectively. In this case the other starter-generator serves firstly as a starter and then as a recuperator, in order to charge the battery.

U.S. Pat. No. 6,040,643 A discloses a motor unit for a vehicle. The vehicle comprises a combustion engine and relatively flat electric motor arranged coaxially with the former. At rest and at low rotational speeds the electric motor is designed to apply a maximum torque which exceeds the resistance torque of the combustion engine in its resting state. In addition, the electric motor is able to generate up to one third of the torque of the combustion engine. This makes the electric motor suitable for starting the combustion engine even at low temperatures. Owing to the design of the electric motor, the vehicle can be moved at low speeds solely by the electric motor, should the combustion engine fail, for example. Moreover, if needs be, the power output of the electric motor may be delivered in addition to the power output of the combustion engine, affording an addition to the prevailing torques.

US 2012/0006152 A1 shows a drive system for a motor vehicle. Serving as prime mover is an internal combustion engine, which can be coupled by way of a transmission to a drive axle of the motor vehicle. Two starter-generators are also provided. The first of the starter-generators can be coupled to the drive axle or a drive shaft of the transmission. The second starter-generator on the other hand is connected to the internal combustion engine by way of a belt drive. The second starter-generator serves for starting the internal combustion engine and for recovering energy in the form of electrical current. Where necessary, the two starter-generators are also capable of applying a torque in addition to the torque of the operational internal combustion engine. Furthermore, a purely electrical drive mode is afforded by the first starter-generator. In the electrical drive mode the internal combustion engine is inactive and decoupled by a clutch from the rest of the drivetrain. If the battery condition is low, the decoupled internal combustion engine can also be activated in the electrical mode, in order to drive the second belt-driven starter-generator as a recuperator. The internal combustion engine, basically decoupled in the electrical drive mode, thus serves solely for charging the battery.

U.S. Pat. No. 6,082,476 A sets forth a self-charging electric vehicle. The vehicle comprises two generator units. The first generator unit comprises a charged starter battery, a first electric motor and a generator coupled to a first wheel axle. The second generator unit comprises a second electric motor, two uncharged batteries and two identical generators, which are coupled to a second wheel axle. The concept assumes that the vehicle is operated firstly with the first generator unit. Whilst the vehicle is moving the first generator is intended to serve for recharging the starter battery, initially under load. At the same time the two identical generators of the second generator unit are intended for charging the two uncharged batteries. As soon as the charge condition of the two batteries of the second generator unit reaches a predetermined level, the drive switches over to the second generator unit. Here the two now charged batteries are intended to drive the second electric motor. At the same time the first electric motor is shut off and the starter battery is intended to be fully charged by the generator of the first generator unit. The concept therefore assumes that there is a need only for a single exogenous charging process of the starter battery, and that the electric vehicle can then be operated self-sufficiently. No account has been taken here of any losses within the system shown.

US 2011/0061955 A1 comprises a drivetrain arrangement for a vehicle having an internal combustion engine. The internal combustion engine can be coupled to an automatic transmission by way of a clutch. Here at least one direct-gear transmission to the power axle of the vehicle is feasible. In order to provide a power reserve, a further power source is proposed for applying an additional drive torque. An electric machine, which may also be used for driving the vehicle electrically, may serve as additional power source.

In the state of the art the electric motors proposed for the purely electrical operating mode are integrated directly into the drivetrain. The systems providing an electrical or electrically assisted drive mode differ, particularly in the electrical operating mode, according to whether the drive axle is coupled to the electric motor or the internal combustion engine. Besides the requisite and generally elaborate configuration of the drive train, the electrical operating mode, in particular, requires a corresponding control on the part of the person steering the vehicle. This applies primarily to conventional vehicles having manual shift transmission, which in the electrical operating mode decouple the internal combustion engine from at least the one drive axle. The then direct driving of the respective wheels by an electric motor makes the handling different in as much as the otherwise usual operation, for example by way of a gas pedal and a clutch, no longer applies. Furthermore, the automatic start-stop systems currently used still leave room for improvement, particularly in order to match the starting process even more accurately to the timing actually required for the starting up of the internal combustion engine. The aim here is to further reduce the fuel consumption.

Against this background, a method for improving operation of a vehicle having an internal combustion engine and a starter-generator integrated by way of belt drive is provided and described herein with regard to the figures. The method may include allowing uniform operability both in the conventional drive mode and in the purely electrical drive mode, serving particularly in a driveaway situation to reduce the fuel consumption of the internal combustion engine during the starting process. It will be appreciated that a driveaway situation may be when a driver is anticipating a need for motive power in the vehicle to maneuver the vehicle. For instance, a driveaway situation may be when a driver has turned an ignition key and the vehicle is stopped (e.g., parked) or when a vehicle is stopped at a stop sign, stop light, in traffic, etc., and motive power to accelerate the vehicle is anticipated.

This object is achieved by a method having the features the engine described above. Further, particularly embodiments of the system and method disclosed by the respective dependent claims.

It is to be pointed out that the features individually cited in the following description may be combined with one another in any technically suitable manner and may demonstrate further embodiments of the vehicle, engine, method, etc. The description additionally characterizes and specifies the vehicle, engine, method, etc., particularly in connection with the figures.

In one approach, the vehicle includes an internal combustion engine and a starter-generator. Here the starter-generator has a torque-transmitting connection to the internal combustion engine. In order to allow this form of coupling, a suitable belt drive is provided, which correspondingly connects the starter-generator to the internal combustion engine. For this purpose the starter-generator preferably has a belt pulley, onto which a belt of the belt drive is laid. Said belt is furthermore connected to a crankshaft of the internal combustion engine. For this purpose the crankshaft may likewise comprise a belt pulley.

It is naturally also possible to couple the belt to another axis of rotation of the internal combustion engine, which interacts with the crankshaft. Thus, for example, said axis of rotation may have a speed ratio between itself and the crankshaft. Furthermore the belt pulleys used may also have different diameters in order to provide a desired transmission ratio between the starter-generator and the internal combustion engine.

In one example, in a driveaway situation of the vehicle, the starter-generator is activated in order to generate a torque. In contrast to the usual starting process of an internal combustion engine, however, there is no provision initially for the initiation of a combustion process. In other words, for the time being no fuel is delivered to the combustion chamber(s) of the internal combustion engine, for example by way of fuel injection. Accordingly, in the absence of an ignitable fuel-air mixture there is no ignition process. Thus, according to one aspect, the internal combustion engine is not just cranked at a low speed as usual, but, dispensing with a combustion process, is revved up at least to an idling speed. As soon as the idling speed is reached, the internal combustion engine may be maintained at least at this idling speed. The starter-generator delivers the torque needed for this, the torque being transmitted to the internal combustion engine by way of the belt drive.

In one example, the actual combustion process of the internal combustion engine, passively turned by the starter-generator, is started only by the actuation of a throttle control element. The throttle control element may be a foot-operated gas pedal, for example. The throttle control element may also be formed by similarly acting arrangements, for example by a gas tap or a gas lever (manual throttle). As soon as the combustion process is started, the starter-generator is preferably deactivated as an electric motor. In other words, from this point onwards the starter-generator may no longer be actively involved in the generation of a torque. Since the vehicle and method described herein provides for a permanent connection of the starter-generator to the internal combustion engine by way of the belt drive, this is now turned passively by the internal combustion engine. In this way the torque now generated by way of the actively running internal combustion engine is used in order to generate current by way of the starter-generator. From this point onwards the starter-generator is then able to act as a generator or recuperator and can feed the energy thus generated into an energy accumulator, in particular into a battery, if desired. As described herein, a battery is taken to mean an accumulator, which as a rechargeable energy accumulator serves to deliver and to store energy (e.g., electrical energy).

Following activation of the starter-generator, various requirements and states are now feasible, which arise in the further course of vehicle operation. Thus, for example, the readiness established in this way may be a premature action, when the torque now available is not subsequently called upon. An advantageous measure caters for this eventuality in that the starter-generator, activated for generating the torque, is deactivated after a predetermined time interval when the vehicle is stationary. This ensures that the activation of the starter-generator is initially a temporary state, which is terminated after a fixed length of time. The advantage to this is that it conserves the energy in the accumulator, by way of which the starter-generator, turning in readiness, is supplied with energy.

Said time interval may be interrupted at the instant the throttle control element is actuated. Since actuation of the throttle control element initiates the starting of the combustion process, the time interval may be automatically interrupted and the starter-generator is deactivated as an electric motor.

The belt used may be a V-belt or a flat belt, for example. Said belts may provide a level (e.g., limited level) of the transmissible belt forces resulting from the torques at any given instant. The belt may be a toothed belt. This makes it possible to transmit even large belt forces without any slipping. The belt pulley(s) interacting with the belt may be matched accordingly, depending on the type of belt used, if desired.

One advantage of the aforementioned engine and method is in the provision of an internal combustion engine turning at least at idling speed without any emissions. In this way the vehicle can be operated as usual with a clutch, by way of which a frictional power connection, releasable in operation, can be established between the internal combustion engine, turned by the starter-generator, and a drive axle of the vehicle. Consequently it is possible to drive or move the vehicle slowly away via the starter-generator. Congested traffic situations, for example, are typified by a frequent actuation of the clutch, usually allowing only a gradual advance at low speed (stop-go traffic). In this context the vehicle affords the advantage that this phase is possible without even once starting the internal combustion engine. Besides saving fuel and less wear to the internal combustion engine, noise and pollutant emissions are greatly reduced or even eliminated altogether, in some cases.

In this context the starter-generator, in particular one connected to the drivetrain by way of a belt drive, affords various advantages. In addition to the ease of integration into the existing architecture of the drivetrain, an outstanding feature is its quiet running. The reason for this lies in the use of a belt for transmitting power, which very largely prevents or at least significantly reduces any transmission of the running noises of the starter-generator, or the vibrations resulting with other types of transmission, to the other parts of the drivetrain.

The search for a parking space and in particular the parking process itself, for example, represent other typical situations. Here too, the vehicle is generally moved slowly. Moreover, the frequent maneuvering of the vehicle may necessitate repeated actuation of the clutch and of the manual shift transmission. Furthermore, in urban areas no nuisance is caused to any passers-by or residents during the parking process by the noise and exhaust gases otherwise usually generated, which are here avoided through operation of the vehicle described herein.

Compared to the vehicle and method described herein, prior art start-stop systems known in the state of the art, in particular, have the disadvantage that the internal combustion engine, shut off while the vehicle is stationary, is already started through actuation of the clutch. In practice, however, such systems start too early. This has to do with the operation by the person driving the vehicle who, for example, according to habit or predisposition already actuates the clutch prematurely. This results in unnecessarily high fuel consumption.

Traffic light phasing or general stop signals frequently provoke a certain form of stress. What matters here is to set the vehicle in motion rapidly (e.g., as soon as possible) when the signals change and in particular to not hold up the traffic behind the vehicle unnecessarily. For this reason a readiness to drive away may be already established in good time, which leads to a premature starting of the internal combustion engine. The combustion process of the internal combustion engine may be already started at a point in time when the driveaway process is not even imminent, since the vehicle still sits stationary for some time with the engine running. As a result the fuel consumption therefore already occurs in a phase in which there is as yet no torque demand of any kind. Moreover, the internal combustion engine at this point is being operated in a working range which only develops a small amount of power for a relatively high fuel consumption.

As such in one approach, at least one drive axle is provided, which by way of a manual shift transmission can be coupled to the internal combustion engine for the transmission of torque. The coupling is advantageously performed by way of a clutch. In one embodiment said clutch may be actuated by way of a foot pedal, more specifically by way of a clutch pedal, or another similarly acting arrangement. Actuation involves a disengagement and an engagement of the clutch. The coupling thereby possible between the internal combustion engine and the drive axle can be separated, particularly in operation. In this context the starter-generator is activated by the following steps, in order to generate the torque to be transmitted to the internal combustion engine:

a) decoupling of the internal combustion engine from at least the one drive axle and b) engagement of a gear on the manual shift transmission.

Here the internal combustion engine is decoupled from at least the one drive axle by way of the clutch. This may be a beneficial construction in which the clutch is arranged between the internal combustion engine and the manual shift transmission. In order to deliver the torque, thus transmitted from the internal combustion engine to the manual shift transmission, to the drive axle, the drive axle may have a direct or indirect torque-transmitting connection to the manual shift transmission.

The proposed steps a) and b), described above, serve to establish a readiness of the inherently passive internal combustion engine, which is revved up by the starter-generator at least to idling speed and maintained at that speed. These measures, entrusted to the person steering the vehicle, for initiating the movement of the vehicle mean that a torque can be called upon directly in the usual way, if desired. The torque thus available can be immediately transmitted to at least the one drive axle though the engagement of the clutch, thereby setting the vehicle in motion. The vehicle is thereby already fully maneuverable, without having had to start the combustion process of the internal combustion engine.

It does not matter here whether a forward gear or a reverse gear has been selected. In both cases the invention provides for activation of the starter-generator. Depending on the embodiment of the starter-generator, a query may ensue as to whether, for example, the forward gear selected is one with a low transmission ratio. In the case of a forward gear the starter-generator is preferably activated on engaging the first gear. This is done in view of the torque that can be generated by the starter-generator, which may be inadequate for a high gear. The first gear is generally a low gear. Where needed, the starter-generator may naturally also be designed in such a way that a movement of the vehicle is also possible with a high gear, in one example.

The European Union the fuel consumption of vehicles is currently determined in a uniform manner, based on a standardized driving cycle. This basis for this is the New European Driving Cycle (NEDC). The standardized driving cycle serves for determining $CO_2$ emissions and the prevailing energy consumption. The conditions and speeds for determining these are specified. In the context of a driveaway situation, the driving cycle provides for a period of five seconds, during which the stationary vehicle remains in gear. With regard to the present description of the vehicle, vehicle system, and method, it will be apparent that although the internal combustion engine may be passively turned by the starter-generator during this period, no combustion process takes place, in one example. Consequently the $CO_2$ emissions and the fuel consumption during this period are equal to zero, whereas prior art method the combustion process is already running during this period due to the fact that the clutch was disengaged for the engagement of a gear. If the time interval laid down for deactivation of the starter-generator is at least five seconds, the method according described herein is therefore capable of achieving significantly better values.

In a further state, following the activation of the starter-generator, the clutch of the vehicle may be engaged and the vehicle moved by the rotating starter-generator. This is taken into account in the vehicle by starting the combustion process of the internal combustion engine, turned by the activated starter-generator, once a set speed of the vehicle is exceeded. Once the combustion process has been started, the starter-generator may be deactivated and if needed is used for generating current, if desired. The particular advantage here lies in a smooth transition between electrical and conventional operation of the vehicle for the person steering the vehicle. In this context the speed of the vehicle attainable using the starter-generator is selected so that the internal combustion engine running from this speed onwards is operating in an efficient working range. In other words, the starter-generator, working efficiently at low revs, at first functions as an electric motor, which from a specific speed onwards may be replaced by the then efficiently working internal combustion engine.

In one example, the starter-generator may be designed so that the purely electrical operating mode of the vehicle which this allows is possible up to a predefined speed of the vehicle. In such an example, it is proposed that the starter-generator be capable of accelerating and moving the vehicle up to a speed of 10.0 km/h, if desired. However, other electrical operating mode speed ranges have been contemplated. On the basis of the speed profile, speed gradients and acceleration index, positive or negative, the control is configured to detecting (from the longitudinal acceleration) whether propulsion or deceleration is in progress. It is therefore possible to distinguish between traffic light situations, slow travel and parking. Parking, in particular, can be reliably detected with the aid of the parking assistance systems. Furthermore, these situations may also be detected by way of a "look-up table," therefore providing situation detection. Here account may then also be taken of the electrical performance data of the electric machine and the pedal demand.

In a further state following the activation of the starter-generator, any obstacle to be negotiated or the inclination of the running surface, in particular the road, may need a high torque to drive the drive axle and hence the wheels of the vehicle, in one example. In an exemplary embodiment, it is proposed to cater for this by starting the combustion process of the internal combustion engine, turned by the activated starter-generator, when a torque needed for maneuvering the vehicle exceeds a threshold torque (e.g., maximum torque) that can be generated by the starter-generator, if desired. This is an advantageous way of making the starting of the combustion process dependent upon the needed torque. The internal combustion engine may thereby be started when the torque to be supplied reaches a specific order of magnitude. In this way it may be possible to use a small starter-generator of compact construction, if desired. The torque that can be generated by the starter-generator must be at least sufficient to reach the torque needed to turn the inactive internal combustion engine, if desired. A distinction may be made here between cold and warm starting phases, the internal combustion engine in cold starting may need a greater torque in order to crank it, in some cases.

It is proposed, according to the embodiment, that the internal combustion engine started in the event of a high torque demand may function alone and that the starter-generator therefore be deactivated as electric motor. In a further embodiment the started internal combustion engine interacts with the starter-generator and therefore may only supplies a boost effect by way of an additional torque.

In this context it is proposed that the additional torque generated by the started and therefore running internal combustion engine be adjusted so that the combined torque generated by the activated starter-generator and the internal combustion engine corresponds to the torque required at any given instant. This is an advantageous way of first fully utilizing the efficient working range of the starter-generator, whilst the internal combustion engine only assumes a supplementary function, if desired.

In order then to allow a purely electrical maneuvering of the vehicle, when the internal combustion engine is shut off, at least one drive axle of the vehicle torque is coupled to the internal combustion engine for the transmission of torque. This can be done, for example, through engagement of the clutch, as already described previously. Here the torque needed to drive at least the one drive axle may be generated solely by the starter-generator connected to the internal combustion engine. The advantage of this embodiment lies in the conventional construction of the entire drivetrain, which is easily supplemented by the starter-generator. The entire operation of the vehicle therefore conforms to the usual procedure, which typically consists of a combination of engagement, shifting and actuation of the throttle control element.

In order to maximize efficiency here, an especially advantageous measure provides for opening of exhaust valves of the internal combustion engine during the electrical maneuvering of the vehicle. As a result, during the purely electrical operating mode of the vehicle by the starter-generator no resistance has to be overcome from the compression otherwise occurring in the cylinder, if desired. The torque needed for turning the inactive internal combustion engine may be consequently reduced to the friction that has to be overcome. This is an advantageous way of making the torque that can be generated by the starter-generator available with only small losses due to friction, in order to move the vehicle in the desired way by relaying torque to at least the one drive axle of the vehicle.

In a further advantageous measure during the purely electrical operating mode of the vehicle, during electrical maneuvering of the vehicle the speed of the internal combustion engine generated by the starter-generator is adjusted through the actuation of a throttle control element. In order words, the vehicle can thereby be operated in the conventional way, since the throttle control element serves for regulating the speed of the drive in the usual way. In conventional operation with the internal combustion engine running, therefore, its charge of fuel-air mixture can be manipulated by way of the throttle control element, whilst in the purely electrical operating mode the speed of the starter-generator can be regulated by way of said throttle control element. Here therefore, the throttle control element may be a combined gas and current pedal.

In order to allow uninterrupted operation of the vehicle, according to one technique, the starter-generator may be supplied with energy by an energy accumulator, the combustion process of the internal combustion engine, turned by the starter-generator, being started when the charge condition of the energy accumulator falls below a predetermined value. This advantageously provides continuous operation of the vehicle by monitoring the energy accumulator, in particular the battery. Consequently, with a low charge condition the combustion process in the internal combustion engine can be started even when all other factors may lead to the initiation of a purely electrical operating mode.

The method for operating a vehicle described herein allows uniform operability both in conventional and in purely electrical drive mode, if desired. This allows the drivetrain to utilize a clutch and a manual shift transmission, which is supplemented only by the starter-generator in combination with the belt drive. This also makes retrofitting to finished vehicles feasible, since the addition of the starter-generator and corresponding control electronics may only need a small outlay. Depending on the design here, adjustments may have to be made to the existing energy accumulator in the form of the battery.

As a result, in the manner described the fuel consumption of the internal combustion engine is significantly reduced during the starting process, especially in a driveaway situation. It is furthermore possible to handle typical driving situations such as stop-go traffic, parking and slow driving in general purely electrically, which leads overall to a reduction of the fuel consumption and the nuisance from engine noise.

Figure 1:
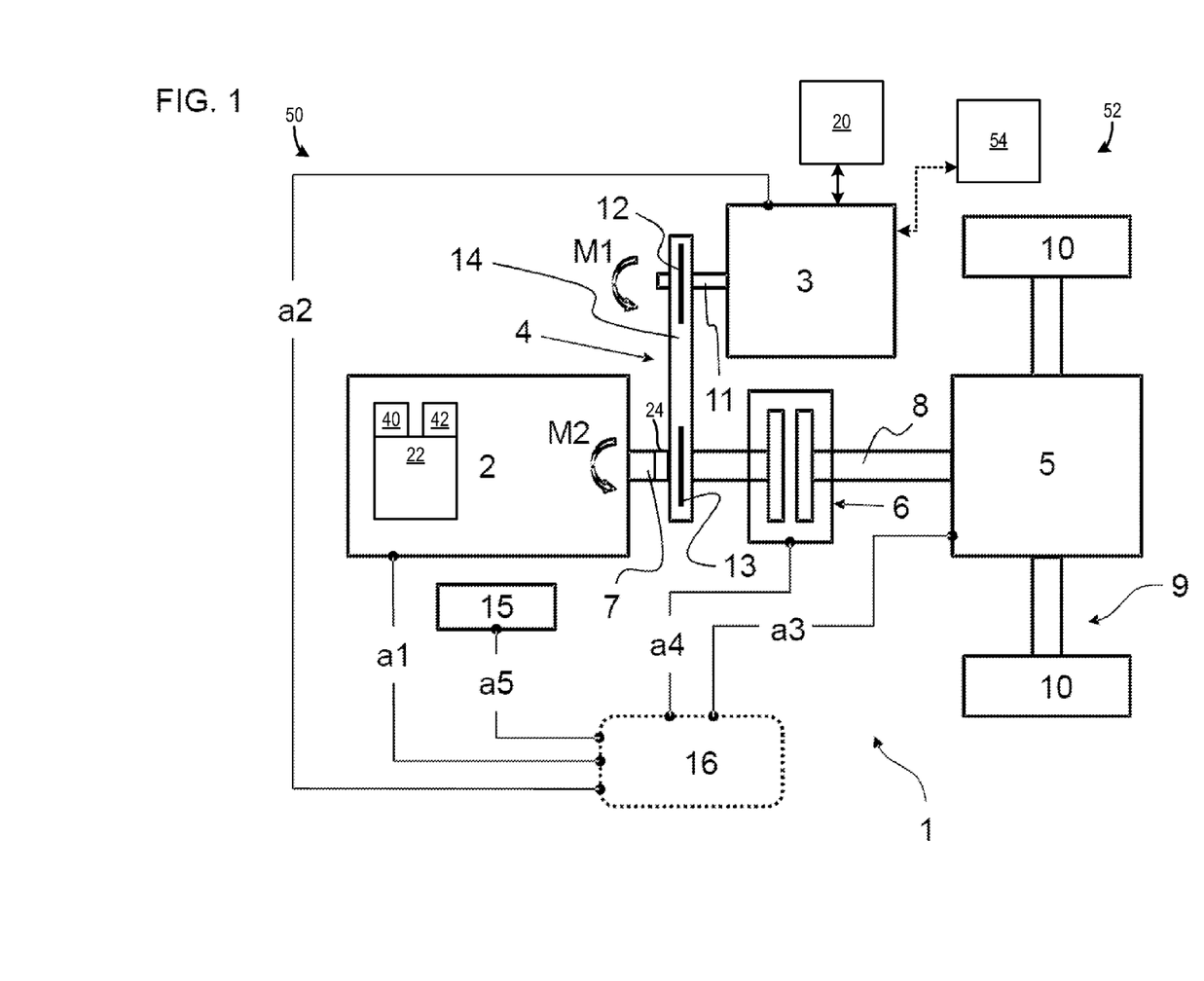
FIG. 1 shows a schematic depiction of a vehicle.

FIG. 1 shows the schematic construction of a vehicle 1 according to an exemplary embodiment. The vehicle 1 comprises an internal combustion engine 2 and a starter-generator 3. The internal combustion engine 2 includes a cylinder 22. Valves 40 and 42 (e.g., intake and exhaust valves) are coupled to the cylinder and configured to flow intake air into and the cylinder and exhaust gas away from the cylinder. The internal combustion engine 2 may be configured to implement combustion operation in the cylinder 22. It will be appreciated that the starter-generator 3 may be more generally referred to as an electric motor. Thus the starter-generator 3 is configured to generate a rotational output as well as receive a rotational input and generate electrical energy output for charging an energy accumulator (e.g., battery) from the rotational input, for example.

The starter-generator 3 may be connected to the internal combustion engine 2 by way of a belt drive 4 in such a way that a torque M1 that can be generated by the starter-generator 3 can be transmitted to the internal combustion engine 2.

In addition the vehicle 1 comprises a manual shift transmission 5, which can be coupled to the internal combustion engine 2 for the transmission of torque. The releasable coupling is achieved by a clutch 6, which is arranged between a crankshaft 7 of the internal combustion engine 2 and a drive shaft 8 of the manual shift transmission 5. The manual shift transmission 5 has a torque-transmitting connection to a drive axle 9, the free ends of which are coupled to wheels 10 of the vehicle 1. The crankshaft 7 includes an output 24. As shown, the starter-generator 3 is coupled to the output 24 (e.g., crankshaft output) via belt pulleys (12 and 13). The manual shift transmission 5 is configured to shift between gears in response to driver input, such as shifting of a hand level shift and engaging/disengaging a clutch pedal, for example. However, numerous types of manual shift transmission have been contemplated. Additionally in one example, the manual shift transmission 5 may include forward drive gears as well as reverse drive gears.

In order to transmit the torque M1 that can be generated by the starter-generator 3 to the internal combustion engine 2, the starter-generator 3 has an axis of rotation 11, which at its free end has a torsion-resistant connection to a first belt pulley 12 of the belt drive 4. The belt drive 4 on the other hand may comprise a second belt pulley 13, which likewise may have a torsion-resistant connection to the crankshaft 7 of the internal combustion engine 2. In order to couple the two belt pulleys (12 and 13) together for transmission of the torque M1, these are connected to one another by a belt 14 of the belt drive 4, in the depicted example.

A throttle control element 15 is also provided, which here is embodied as a gas pedal. However, other throttle control elements have been contemplated. For instance, the throttle control element may be buttons, paddles, etc., positioned on a steering wheel, in one example. The individual assemblies of the vehicle 1 in the form of the internal combustion engine 2, the starter-generator 3, the manual shift transmission 5 and the clutch 6 together with the throttle control element 15 are connected by way of suitable connections a1-a5 to a situation detection unit 16. The connections a1-a5 may be both physically provided leads and/or wireless embodiments, for example radio connections. In practice the simplified connection a4 represented here and connected to the clutch 6 may also be connected to a corresponding clutch pedal (not shown) or to a similarly acting actuation device.

As can be seen, the belt drive 4 represents a permanent connection between the starter-generator 3 and the internal combustion engine 2. The starter-generator 3 may be operated actively or passively. On activation of the starter-generator 3 may acts as electric motor, in order to generate the torque M1. In the deactivated state the starter-generator 3 may turn, driven by the operational internal combustion engine 2, so that the starter-generator 3 can be used as a generator, more specifically as a recuperator, if desired. For this purpose a torque M2 generated by the running internal combustion engine 2 is transmitted to the starter-generator 3 by way of the belt drive 4. The energy that can be generated by this in the form of electricity may be stored in the energy accumulator 20, for example a battery. Said energy accumulator serves further to supply the starter-generator 3, in its activated state as electric motor, with the desired energy in the form of current.

The arrangement shown in FIG. 1 illustrates that the drive shaft 8 of the manual shift transmission 5 and hence the drive axle 9 of the vehicle 1 may be operated both by way of the internal combustion engine 2 and by way of the starter-generator 3. Here the torques M1, M2 that can be generated are in each case first transmitted from the crankshaft 7 of the internal combustion engine 2 to the clutch 6. From there these torques may be transmitted, when the clutch 6 is in the engaged state, to the drive axle 8 of the manual shift transmission 5, which relays the respective torque M1, M2 with a corresponding transmission ratio to the drive axle 9 and consequently to the wheels 10.

The energy accumulator 20 is coupled to the starter-generator 3. Specifically, the energy accumulator 20 is configured to receive energy (e.g., electrical energy) from the starter-generator 3 and store the energy. The energy accumulator may be a battery, capacitor, flywheel, combinations thereof, or other suitable device configured to store energy.

The internal combustion engine 2 may be included in an vehicle system 50. However in other examples additional or alternate components may be included the vehicle system 50. Additionally, the vehicle system 50 may include a control sub-system 52. The control sub-system 52 may include a controller 54 having code stored in memory executable by a processor to implement the control routines, methods, etc., described herein. Moreover, the controller 54 may receive input from a plurality of sensors.

The vehicle system 50 may further include the crankshaft 7 having the output 24 and the cylinder 22. The vehicle system 50 may further include the starter-generator 3 rotationally coupled to the output 24 of the crankshaft 7. The starter-generator 3 is configured to operate in a drive mode to provide rotational output to the crankshaft and in a recharge mode to receive rotational input from the crankshaft and charge the energy accumulator 22 coupled to the starter-generator 3. The vehicle system 50 may further include the clutch 6 configured to engage and disengage the crankshaft from the manual shift transmission 5, the manual shift transmission 5 coupled to at least one drive axle 9 and the clutch. The vehicle system 50 further includes The control sub-system 52 is configured to, during a first operating condition, operate the electric motor in the drive mode to provide rotational output to the driveshaft to rotate the driveshaft within a predetermined speed range while inhibiting combustion operation in the cylinder and during the second operating condition, activating combustion operation in a cylinder of the internal combustion engine in response to a combustion activation trigger.

It will be appreciated that the first operating condition may be when the vehicle is below a threshold speed and the second operating condition may be when the vehicle is greater than the threshold speed. Additionally or alternatively the first operating condition may include a condition where the state of charge in the energy accumulator is greater than a threshold value and the second operating condition may be when the state of charger in the energy accumulator is less than a threshold value.

In the depicted example, the starter-generator 3 is coupled to the crankshaft 7 via a belt pulley (12 and/or 13). In one example, the combustion activation trigger includes one or more of actuation of a throttle control element and actuation of a clutch pedal coupled to the clutch.

The control sub-system 52 may be further configured to, during the first operating condition, disengage the crankshaft 7 from the manual shift transmission 56 through operation of the clutch 6 and engaging a gear in the manual shift transmission.

Additionally the control sub-system 52 may be further configured to, during the first operating condition, engaging the crankshaft 7 with the manual shift transmission 5 and adjusting the speed of the crankshaft to provide motive power to the wheel 10 coupled to the manual shift transmission via the drive axle 9.

Figure 2:
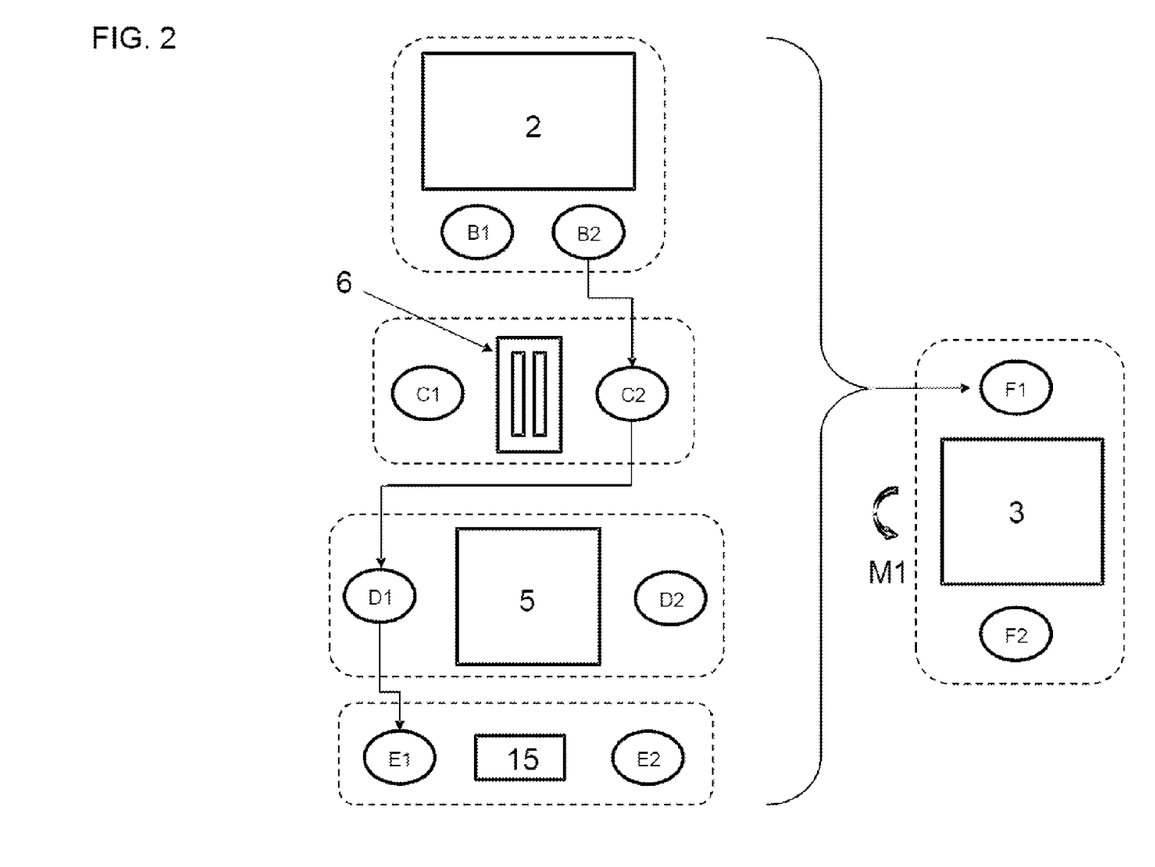
FIG. 2 shows a schematic flow chart for a driveaway situation.

FIG. 2 shows a schematic flow chart for a typical driveaway situation of the vehicle 1. The respective states of the assemblies 2, 3, 5, 6 already previously listed and of the throttle control element 15 are reported, by way of the connections a1-a5 in FIG. 1, to the situation detection unit 16 likewise shown in FIG. 1 and not represented below for reasons of clarity. In order to then obtain the purely electrically generated torque M1 of the starter-generator 3, this may be correspondingly activated as an electric motor. Here it is first queried whether or not a combustion process is currently taking place inside the internal combustion engine 2. In other words, a check is first performed as to whether the internal combustion engine 2 is in operation, that is to say "On" B1 or shut off, that is to say "Off" B2.

If the internal combustion engine 2 is not in operation, that is to say in the "Off" state B2, the next step is the query to the clutch 6. Its state is detected as "engaged" C1 or "disengaged" C2. If the clutch pedal is depressed, for example, the "disengaged" state C2 is detected here, whereupon a status query to the manual shift transmission 5 ensues. This focuses on the question of whether a "gear is engaged" D1 by the manual shift transmission 5 or whether this is currently in an "out of gear" D2 state. If the query to the manual shift transmission 5 reveals that a gear D1 is engaged, a further query ensues as to the state of the throttle control element 15. This may basically be in the "unactuated" state E1 or "actuated" state E2. If this is unactuated E1, all factors are indicative of a shortly impending driveaway process. On the basis of the states previously listed and evaluated in the situation detection unit 16, a corresponding signal is now triggered, which sets the starter-generator 3 into the "active" state F1, consequently activating this. The starter-generator thereby functions as an electric motor, so that the torque M1 is generated.

As can be seen in FIG. 1, said torque M1 is now transmitted by way of the belt drive 4 to the crankshaft 7 of the internal combustion engine 2, so that this is passively turned. In one example, this is revved up at least to an idling speed and is maintained at least at the idling speed. The torque M1 now available can thereby already be used to turn the drive axle 9 and hence the wheels 10, so that the vehicle 1 is moved. To do this the clutch 6 may be engaged in order to establish a frictional power connection between the crankshaft 7 of the internal combustion engine 2, turned by the starter-generator 3, and the drive shaft 8 of the manual shift transmission 5.

Figure 3:
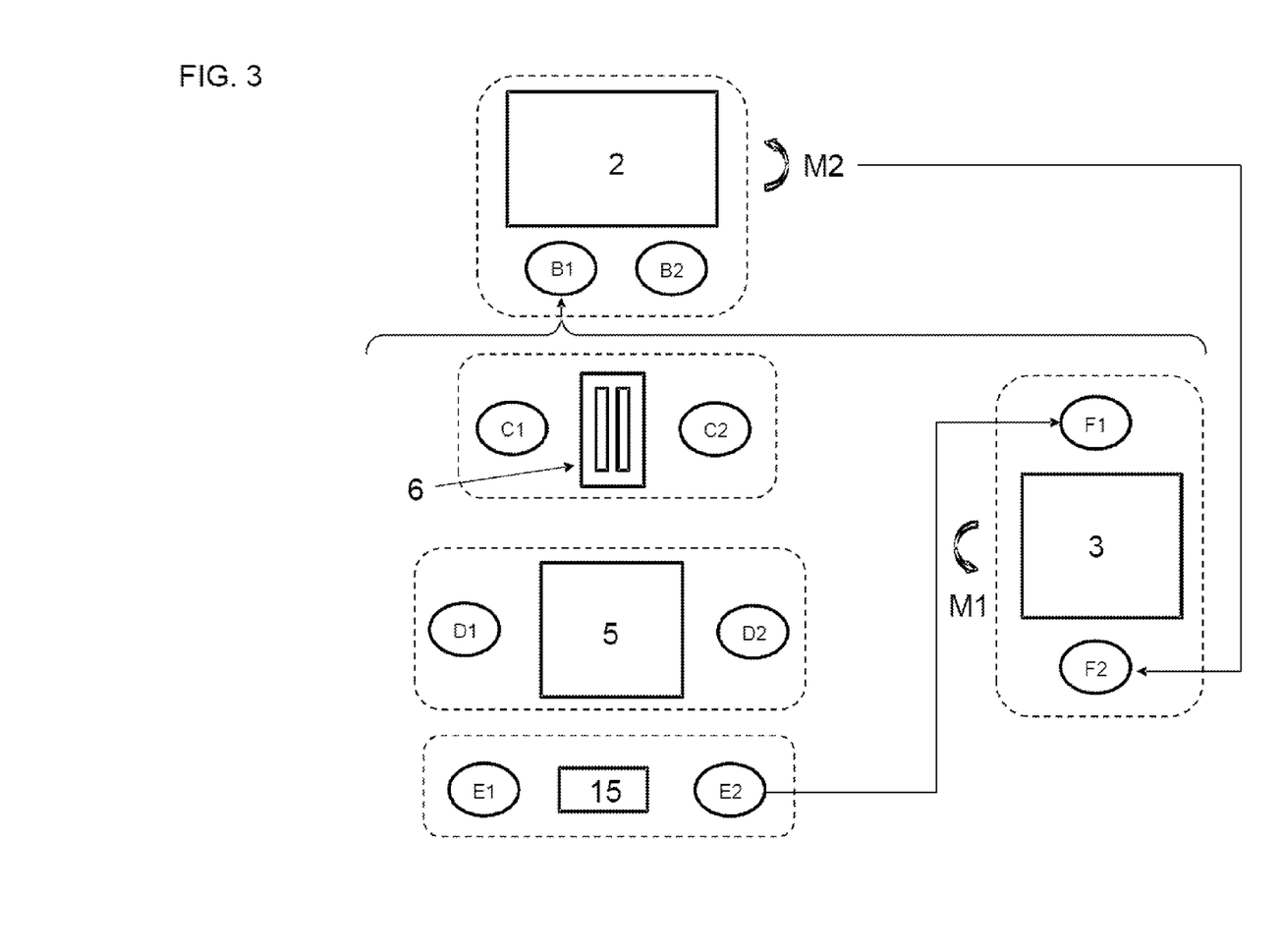
FIG. 3 shows another schematic flow chart of the driveaway situation.

FIG. 3 now shows the state which typically ensues once the vehicle 1 has stopped at traffic signals. The assumptions on which the schematic flow chart is based are the previously queried states and the starter-generator 2 in FIG. 2 in the "active" state F1, that is to say generating the torque M1. Once the traffic lights change from the red phase, for example, a person steering the vehicle 1 will now actuate the throttle control element 15, in order to achieve a corresponding torque and an increase in engine speed. The combustion process in the internal combustion engine 2 is thereby started, so that this in the "On" state B1 in turn actively generates the torque M2. As soon as the internal combustion engine 2, previously still turning passively at least at idling speed, is started, the starter-generator 3 is deactivated by the situation detection unit 16 and is set to the "passive" state F2. In this state the starter-generator 3 functions passively, in as much as it converts the torque M2 of the internal combustion engine 2, transmitted to it by the belt drive 4, into electrical energy.

Figure 4:
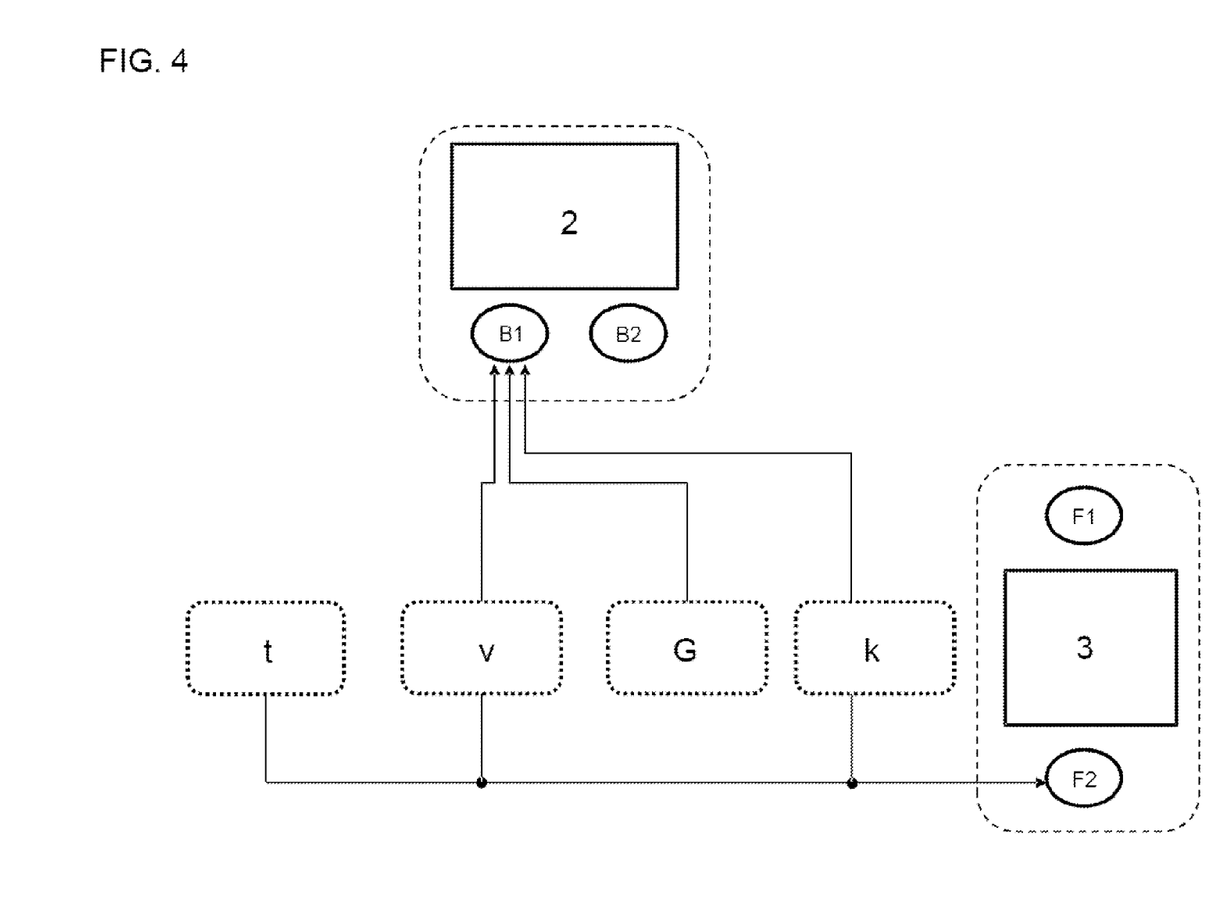
FIG. 4 shows a schematic flow chart for various situations during the electrical operating mode of the vehicle according to an example embodiment, in which the combustion process of the internal combustion engine is started.

FIG. 4 is based on the purely electrical operating mode of the vehicle 1, as results from FIG. 2, for example. Depending on external influences and the driving condition, it may desirable to start the combustion process of the internal combustion engine 2, passively turned by the starter-generator 3.

Thus in one example, the combustion process of the internal combustion engine 2, turned by the activated starter-generator 3, is started, for example, as soon as a torque G needed for maneuvering the electrically operated vehicle 1 exceeds the threshold torque M1 (e.g., maximum torque) that can be generated by the starter-generator 3. The internal combustion engine is thereby set to the "On" state B1. In this way it is ensured that sufficient power is available for any driving situation by the drives 2, 3 present on board the vehicle 1.

A further situation ensues when in the electrical operating mode the starter-generator 3 is supplied with energy by an energy accumulator and the charge condition k of said energy accumulator falls below a predetermined value. In this case it is assumed that in the short term there may not be a desired amount of energy available to operate the starter-generator 3. In this case the combustion process of the internal combustion engine 2, turned by the starter-generator 3, is likewise started, so that this goes into the "On" state B1. This means that besides the torque M2 then conventionally available it is also possible, in particular, to charge up the energy accumulator by the starter-generator then functioning in the "passive" state F2 as a generator.

Proceeding from the situation represented in FIG. 2, it is further proposed, in order to establish a driveaway readiness, that the starter-generator 3, activated for generation of the torque M1, should go into the "passive" state F2 and therefore be deactivated after a predetermined time interval t when the vehicle 1 is stationary. This conserves the charge condition of the energy accumulator, since there may be intention to drive the vehicle 1 away. The deactivation of the starter-generator after the fixed time interval t is naturally initiated only if no actuation of the throttle control element 15 ensues within this time interval t. In one example, this measure in any case caters for starting ("On" state B1) of the combustion process of the internal combustion engine 2 and deactivation ("passive" state F2) of the starter-generator 3.

Finally a further situation ensues requiring the "On" state B1 and therefore starting of the combustion process of the internal combustion engine 2, turned by the activated starter-generator 3, if a predetermined speed v of the vehicle 1 is exceeded. Since the internal combustion engine 2, rather than the starter-generator 3, is used for driving at higher speeds, in this case the starter-generator 3 is likewise deactivated and is therefore set to the "passive" state F2, in which it can contribute to the recovery of energy as desired (e.g., needed).

Figure 5:
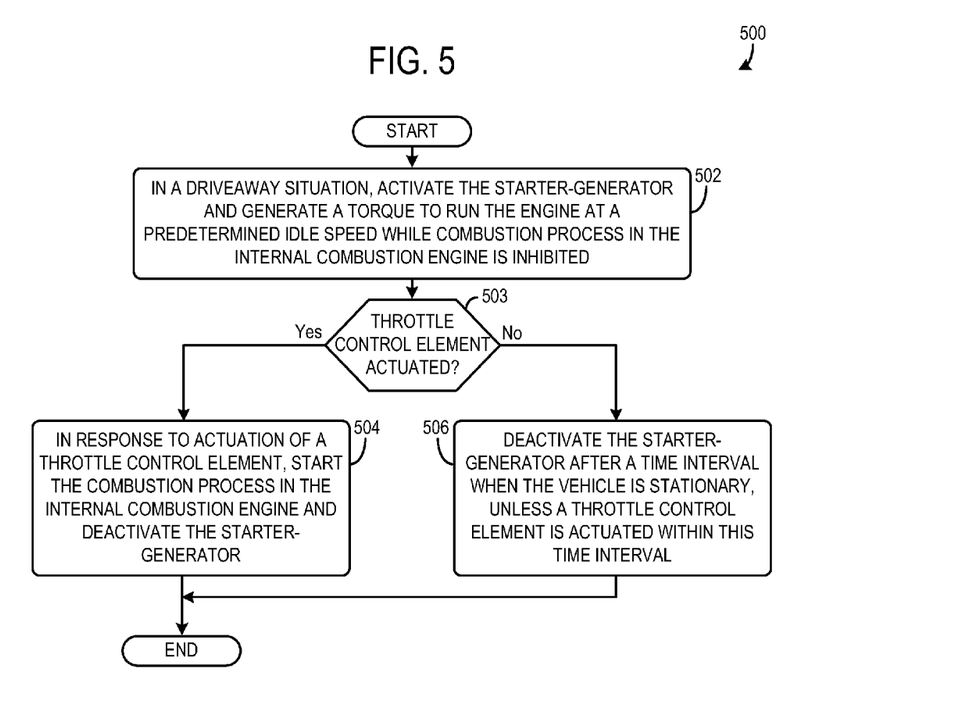
FIG. 5 shows a method for operation of a vehicle.

FIG. 5 shows a method 500 for operating a vehicle including an internal combustion engine and a starter-generator, the starter-generator having a torque-transmitting connection to the internal combustion engine by a belt drive to turn the internal combustion engine. The method 500 may be implemented via the vehicle, vehicle system, engine, etc., described above. However, in other examples the method may be implemented by other suitable vehicles, vehicle systems, engines, etc.

At 502 the method includes in a driveaway situation, activating the starter-generator and generating a torque to run the engine at a predetermined idle speed while the combustion process in the internal combustion engine is inhibited. In one example, where at least one drive axle is provided, which by way of a manual shift transmission can be coupled to the internal combustion engine for the transmission of torque, where the starter-generator is activated by the following steps for generating the torque: decoupling of the internal combustion engine from at least the one drive axle and engaging a gear on the manual shift transmission.

At 503 it is determined if a throttle control element is actuated. If it is determined that the throttle control element is actuated (YES at 503) the method advances to 504. At 504 the method includes in response to actuation of a throttle control element, starting the combustion process in the internal combustion engine and deactivating the starter-generator. However, if it is determined that the throttle control element is not actuated (NO at 503) the method advances to 506. At 506 the method includes deactivating the starter-generator after a time interval when the vehicle is stationary, unless a throttle control element is actuated within this time interval. In one example, where the combustion process of the internal combustion engine, turned by the activated starter-generator, is started if a set speed of the vehicle is exceeded, the starter-generator being deactivated.

In another example, where the combustion process of the internal combustion engine, turned by the activated starter-generator, is started when a torque needed for maneuvering the vehicle exceeds a threshold torque that can be generated by the starter-generator.

Still further in another example, an additional torque generated by the running internal combustion engine is adjusted in such a way that the combined torque generated by the activated starter-generator and the internal combustion engine corresponds to the needed torque.

In another example, a drive axle of the vehicle is coupled to the internal combustion engine for the transmission of torque, the torque for driving at least the one drive axle being generated by the starter-generator connected to the internal combustion engine to provide electrical maneuvering of the vehicle.

In another example, the exhaust valves of the internal combustion engine are opened during electrical maneuvering of the vehicle. In such an example, during electrical maneuvering of the vehicle the speed of the internal combustion engine generated by the starter-generator is adjusted by the actuation of a throttle control element, where the adjusted speed is greater than the idling speed of the internal combustion engine.

Still further in another example, the starter-generator is supplied with energy by an energy accumulator and where a combustion process in the internal combustion engine is initiated if a charge condition of the energy accumulator falls below a predetermined value.

Figure 6:
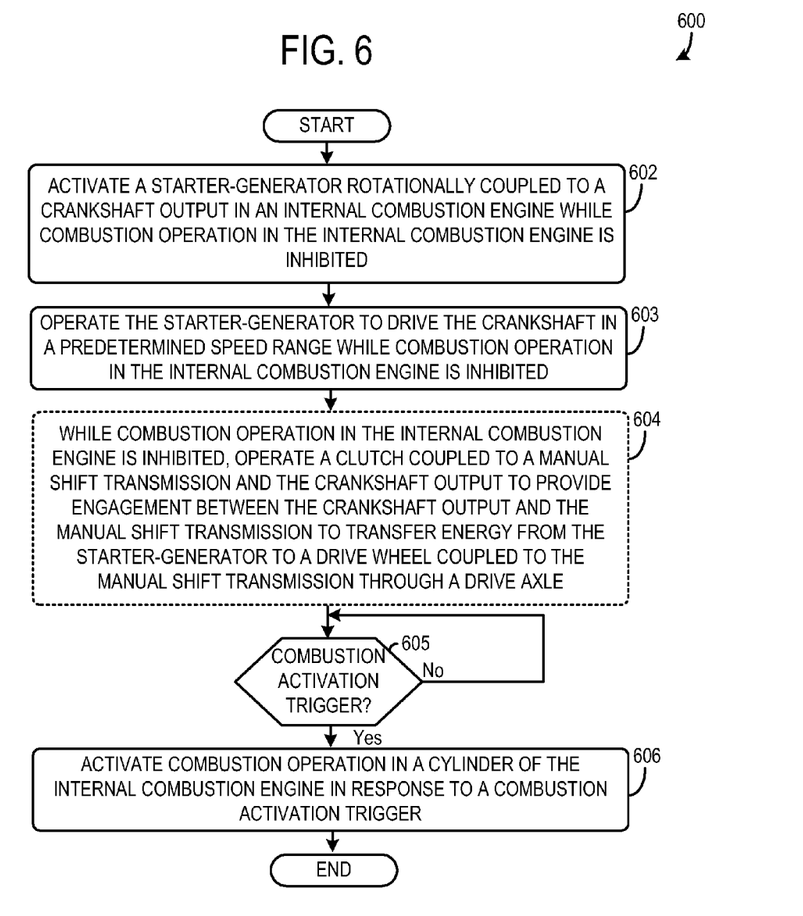
FIG. 6 shows a method for operation of a vehicle system.

FIG. 6 shows a method 600 for operating a vehicle system. The method 600 may be implemented via the vehicle system described above. However, in other examples the method may be implemented by another suitable vehicle system.

At 602 the method includes activating a starter-generator rotationally coupled to a crankshaft output in an internal combustion engine while combustion operation in the internal combustion engine is inhibited. In some examples, the starter-generator may be actuated while the vehicle is at rest and/or a driveaway situation is anticipated.

Next at 603 the method includes operating the starter-generator to drive the crankshaft in a predetermined speed range while combustion operation in the internal combustion engine is inhibited. In one example, inhibiting combustion operation in the cylinder includes at least one of inhibiting fuel injection and inhibiting movement of valves coupled to the cylinder.

Next at 604 the method may include while combustion operation in the internal combustion engine is inhibited, operating a clutch coupled to a manual shift transmission and the crankshaft output to provide engagement between the crankshaft output and the manual shift transmission to transfer energy from the starter-generator to a drive wheel coupled to the manual shift transmission through a drive axle. It will be appreciated that in other embodiments step 604 may not be included in the method 600.

At 605 the method determines if a combustion activation trigger is implemented. In some examples, the combustion activation trigger includes one or more of actuation of a throttle control element and actuation of a clutch pedal coupled to the clutch. If a combustion activation trigger is not implemented (NO at 605) the method returns to 605.

However, if it is determined that an activation trigger is implemented (YES at 605) the method advances to 606. At 606 the method includes activating combustion operation in a cylinder of the internal combustion engine in response to the combustion activation trigger. Further in some examples, the method may include discontinuing operation of the starter-generator when it is determined that a combustion activation trigger is implemented. Still further in other examples, the operation of the starter-generator may be discontinued after a predetermined time interval and/or after a state of charge in an energy accumulator coupled to the starter-generator falls below a threshold value.

LIST OF REFERENCE CHARACTERS a1 connection between 2 and 16
a2 connection between 3 and 16
a3 connection between 5 and 16
a4 connection between 6 and 16
a5 connection between 15 and 16
B1 "On" state of 2
B2 "Off" state of 2
C1 "engaged" state of 6
C2 "disengaged" state of 6
D1 "gear engaged" state of 5
D2 "out-of-gear" state of 5
E1 "unactuated" state of 15
E2 "actuated" state of 15
F1 "active" state of 3
F2 "passive" state of 3
G torque (e.g., needed torque)
k energy accumulator charge condition
M1 torque of 3
M2 torque of 2
t time interval
v speed of 1

The method described above for operating a vehicle is not limited to the measures and embodiments disclosed herein, but naturally also encompasses similarly acting measures and embodiments. Furthermore, a person skilled in the art understands that, although the invention has been described by way of example with reference to one or a plurality of embodiments, it is not limited to the disclosed embodiments and that alternative embodiments could be constructed without departing from the scope of protection of the invention as defined by the accompanying claims.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle including an engine and a starter-generator having a torque-transmitting connection to the engine by a belt drive to turn the engine, comprising:
   in a driveaway situation from stopped, activating the starter-generator and generating a torque to run the engine at a predetermined idle speed while a combustion process in the engine is inhibited;
   responsive to actuation of a throttle control element, starting the combustion process and deactivating the starter-generator.

2. The method of claim 1, where at least one drive axle is provided, which by way of a manual shift transmission can be coupled to the engine for the transmission of torque, where the starter-generator is activated by the following steps for generating the torque:
   decoupling of the engine from at least the one drive axle; and
   engaging a gear on the manual shift transmission.

3. The method of claim 1, further comprising deactivating the starter-generator after a time interval when the vehicle is stationary, unless the throttle control element is actuated within this time interval.

4. The method of claim 1, where the combustion process of the engine, turned by the activated starter-generator, is started if a set speed of the vehicle is exceeded, the starter-generator being deactivated.

5. The method of claim 1, where the combustion process of the engine, turned by the activated starter-generator, is started when a torque needed for maneuvering the vehicle exceeds a threshold torque that can be generated by the starter-generator.

6. The method of claim 5, where an additional torque generated by the engine after the combustion process is started is adjusted in such a way that the combined torque generated by the activated starter-generator and the engine corresponds to the needed torque.

7. The method of claim 1, where at least one drive axle of the vehicle is coupled to the engine for the transmission of torque, the torque for driving at least the one drive axle being generated by the starter-generator connected to the engine to provide electrical maneuvering of the vehicle.

8. The method of claim 7, where exhaust valves of the engine are opened during electrical maneuvering of the vehicle.

9. The method of claim 7, where during electrical maneuvering of the vehicle a speed of the engine generated by the starter-generator is adjusted by the actuation of the throttle control element, where the adjusted speed is greater than the idling speed of the engine.

10. The method of claim 1, where the starter-generator is supplied with energy by an energy accumulator and where the combustion process in the engine is initiated if a charge condition of the energy accumulator falls below a predetermined value.

11. A vehicle system comprising:
    an internal combustion engine including a crankshaft having an output and a cylinder, the internal combustion engine configured to implement combustion operation in the cylinder;
    a starter-generator rotationally coupled to the output of the crankshaft, the starter-generator configured to operate in a drive mode to provide rotational output to the crankshaft and in a recharge mode to receive rotational input from the crankshaft and charge an energy accumulator coupled to the starter-generator;
    a clutch configured to engage and disengage the crankshaft from a manual shift transmission, the manual shift transmission coupled to at least one drive axle and the clutch; and
    a control sub-system with instructions stored in memory to:
       during a first operating condition, operate the starter-generator in the drive mode to provide rotational output to the crankshaft to rotate the crankshaft within a predetermined speed range while inhibiting combustion operation in the cylinder; and
       during a second operating condition, activating combustion operation in the cylinder of the internal combustion engine and deactivating the starter-generator in response to a combustion activation trigger.

12. The vehicle system of claim 11, where the starter-generator is coupled to the crankshaft via a belt pulley.

13. The vehicle system of claim 11, where the combustion activation trigger further includes one or more of actuation of a throttle control element and actuation of a clutch pedal coupled to the clutch.

14. The vehicle system of claim 11, where the control sub-system is further configured to, during the first operating condition, disengage the crankshaft from the manual shift transmission through operation of the clutch and engagement of a gear in the manual shift transmission.

15. The vehicle system of claim 11, where the control sub-system is further configured to, during the first operating condition, engage the crankshaft with the manual shift transmission and adjust a speed of the crankshaft to provide motive power to a wheel coupled to the manual shift transmission via a drive axle.

16. A method for operating a vehicle system comprising:
    activating a starter-generator rotationally coupled to an output of a crankshaft in an engine while combustion operation in the engine is inhibited;
    operating the starter-generator to drive the crankshaft in a predetermined speed range while combustion operation in the engine is inhibited; and
    activating combustion operation in a cylinder of the engine and deactivating the starter-generator in response to a combustion activation trigger.

17. The method of claim 16, where inhibiting combustion operation in the cylinder includes at least one of inhibiting fuel injection and inhibiting movement of valves coupled to the cylinder, wherein the method is carried out responsive to an indication of a parking space detection operating mode by a vehicle operator, and where a gear selected by the operator is a first gear of a transmission.

18. The method of claim 16, where the combustion activation trigger includes one or more of actuation of a throttle control element and actuation of a clutch pedal coupled to a clutch.

19. The method of claim 16, further comprising, while combustion operation in the engine is inhibited, operating a clutch coupled to a manual shift transmission and the crankshaft output to provide engagement between the crankshaft output and the manual shift transmission to transfer energy from the starter-generator to a drive wheel coupled to the manual shift transmission through a drive axle.

* * * * *